United States Patent [19]

Hawkins

[11] 4,178,467
[45] Dec. 11, 1979

[54] BOLTLESS SPACER DEVICE
[75] Inventor: Ronald G. Hawkins, Massena, N.Y.
[73] Assignee: Aluminum Company of America, Pittsburgh, Pa.
[21] Appl. No.: 922,686
[22] Filed: Jul. 7, 1978
[51] Int. Cl.$^2$ .............................................. H02G 7/12
[52] U.S. Cl. ............................... 174/40 R; 24/81 CC; 174/146; 174/155
[58] Field of Search ............... 174/40 R, 42, 146, 155; 24/73 CC, 81 CC, 262; 248/61, 74 R

[56]  References Cited
U.S. PATENT DOCUMENTS

| 1,810,950 | 6/1931 | Earhart | 174/155 |
| 3,161,721 | 12/1964 | Torr | 174/146 X |
| 3,716,650 | 2/1973 | de Mecquenem | 174/146 X |

FOREIGN PATENT DOCUMENTS 415053  9/1946  Italy ......................................... 174/155

Primary Examiner—Laramie E. Askin
Attorney, Agent, or Firm—Elroy Strickland

[57] ABSTRACT

A boltless device for spacing two overhead parallel conductors, the device including a rigid, hollow arm structure adapted to extend between the conductors. First resilient bushing means are located at each end of the rigid arm structure and adapted to engage the respective conductors. A second, outside, resilient bushing means is adapted to engage the conductors in opposed relation to the first bushing means, and two resilient metal clips are adapted to be clipped to the respective ends of the rigid arm structure and around the outside bushing means to secure both bushing means and the arm structure of the overhead conductors. The clips each have a shape that conforms to an outside shape and surface of the second bushing means such that the clips engage the outside surface the full distance thereof when each clip is secured to the arm structure.

8 Claims, 4 Drawing Figures

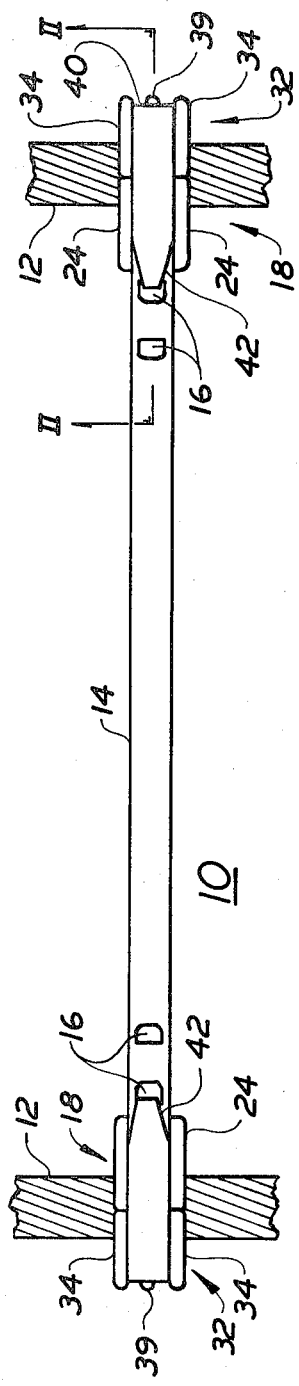
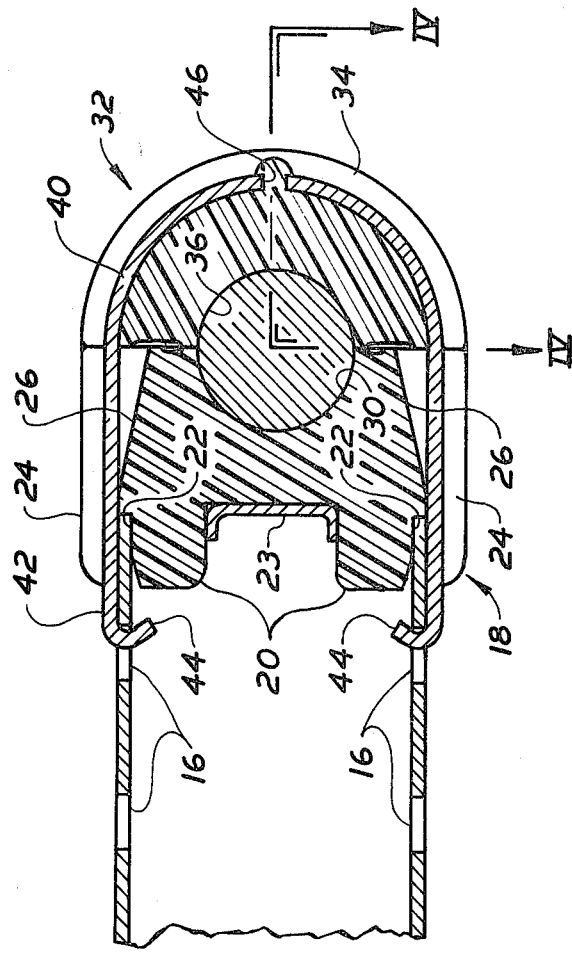
FIG. 1
FIG. 2

BOLTLESS SPACER DEVICE

BACKGROUND OF THE INVENTION

The present invention relates generally to devices for spacing overhead parallel conductors, and particularly to a lightweight, rigid bar device adapted to be clipped to and between the conductors by resilient metal clips in a simple and economical manner.

In U.S. Pat. No. 3,963,855 to R. G. Hawkins el al there is shown spacer bar devices adapted to be clamped to and between two parallel conductors using spring metal clips adapted to clip two opposed metal clamping structures adjacent the ends of the bar structure. The bar and the clamping structures are generally cast, solid metal structures such that the weight of the structures is heavier, and the cost of the structures is more costly, than say a hollow or thin-walled device, such as provided by an extrusion process. In a similar manner, the spacing devices disclosed in U.S. Pat. No. 3,161,721 to Torr, U.S. Pat. No. 3,743,762 to Annas et al, and U.S. Pat. No. 2,915,580 to Gill et al are generally cast, solid metal structures.

Though these structures perform their assigned tasks, namely, the spacing and separation of overhead parallel conductors (of a conductor bundle), there is needed yet in the art a device that is lower in cost and lighter in weight, using less materials. Such a device must not, however, sacrifice reliability, structural strength, and convenience of installation by line personnel.

BRIEF SUMMARY OF THE INVENTION

The present invention accomplishes the above objectives by use of a relatively thin wall, hollow channel or tubular member as the main spacing bar. At each end of the channel or tubular member, and engaging each end of the member, is one-half of a resilient bushing adapted to engage also a respective one of two overhead conductors. A second half of a bushing member is provided and adapted to engage the conductor opposite the first bushing half. The bushing halves (which need not be precise halves of a circular bushing) are clamped together around each conductor by a resilient strap means that clips to the ends of the hollow arm structure, the strap means being formed to fully fit to the contour of the second bushing half. In this manner, a spacing device is provided without the cost of the metal of solid bars and heavy conductor clamps, the hollow channel of the invention being also light in weight. Similarly, the resilient metal straps and the bushing halves are lightweight components. Further, the cost of the device is minimal because of the minimum number of component parts, namely, one channel or tubular member, two metal straps or clips and four bushing halves. A bearing plate may be used at each end of the channel member to protect the bushing halves engaging the ends of the channel member. This plate is also thin, light in weight and low in cost.

THE DRAWINGS

Many additional advantages flow from the above structure, which advantages will be specifically referred to and discussed below in the process of describing the structure in detail and in reference to the accompanying drawings in which:

FIG. 1 is a plan view of the device of the invention;

FIG. 2 is a sectional view of one end of the device, taken along line II—II of FIG. 1;

PREFERRED EMBODIMENT OF THE INVENTION

Figure 3:
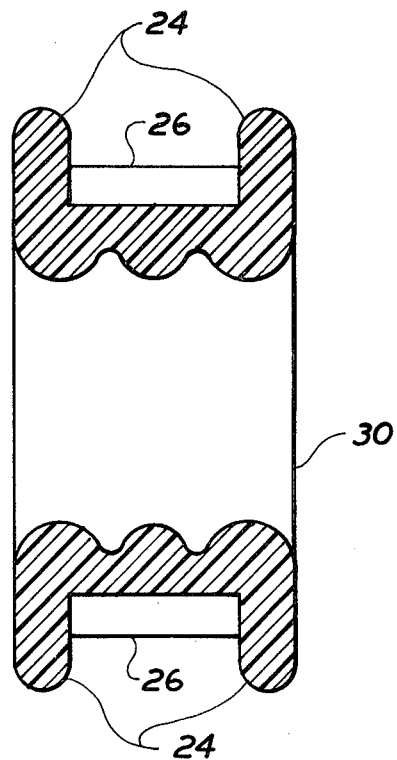
FIG. 3 is an end elevation view of an "inside" bushing half employed in the invention.

Referring now to the drawings, FIG. 1 thereof shows a device and assembly 10 for spacing two, overhead parallel conductors 12. The device 10 includes a straight spacing member 14, which is preferably a hollow tubular member, though a channel structure can also be employed. Openings 16 are shown provided in the wall of the tubular member, referred to hereinafter simply as "the tube" or tube 14, near both ends of the tube. As seen in FIG. 2, the openings are located on opposed sides of tube 14.

At each end of tube 14 is located an "inside" bushing half 18, the bushing halves being configured and adapted to engage the ends of the tube and the overhead conductors, as best seen in the view of FIG. 2. More particularly, bushing half 18 is preferably made of a semiconductive elastomer material, with legs or extensions 20 (FIG. 2) provided at the base of the bushing for extending into the ends of tube 14. The extensions 20 are indented and sized at 22 to the inside dimensions of tube 14 so that bushing halves fit snugly in the ends of the tube. Between the legs or extensions 20 is located a bearing plate 23 that extends across the end of the tube to prevent the end of the tube from cutting into the bushing half.

The outside surface of each bushing half 18 is provided with outwardly rounded extensions or walls 24 that provide two, opposed indented areas and recess surfaces 26, as best seen in FIG. 3. These recess surfaces 26 are tapered or inclined surfaces that extend to the outward face of the bushing, as shown in FIGS. 2 and 3. Finally, bushing half 18 is provided with an outwardly facing circular recess 30 for receiving conductor 12, as shown in FIG. 2.

Figure 4:
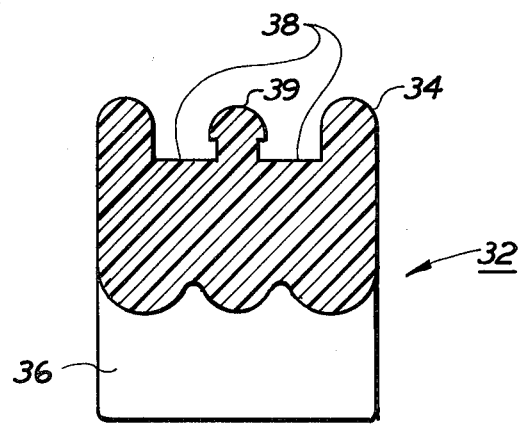
FIG. 4 shows an "outside" bushing half of the invention in longitudinal section taken along line IV—IV of FIG. 2.

Continuing further with FIG. 2, a second, outside bushing half 32 is provided to engage the side of conductor 12 opposite bushing 18. Bushing half 32 has an outside, circular configuration in the form of walls 34 and an internal, circular recess 36, 34 and 36 dimensionally corresponding to those of inside bushing half 18. In FIG. 4 bushing 32 is shown in longitudinal section such that the outside peripheral walls 34 are clearly seen in section, along with a circular recess 38 between the walls, and an integral male projection 39 located in the recess and in the peripheral center of the bushing half, as seen in FIG. 2. The material of bushing 32 is preferably the same as that of bushing 18.

The bushing halves 18 and 32 are secured about a conductor, such as 12, by a resilient clip 40, made of flat, spring metal stock, in the manner shown in FIGS. 1 and 2. More particularly, clip 40 is a U-shaped structure having a circular and dimensional configuration conforming to the rounded, peripheral recess 38 of outside bushing 32, and planar leg portions 42 of equal length extending from the base of the U. The ends of the legs extend inwardly at 44 and are inclined back toward the end of the tube, 44 being adapted to extend into opposed openings 16, as shown in FIGS. 1 and 2, to engage the wall of tube 14, and thereby secure the spacer 10 to and between conductors 12. Parenthetically, it might be noted here that the components being provided with openings 16 and inward extensions 44 may be reversed, i.e., the clips 40 can be provided with the openings while tube 14 is provided with hook means for extending into such openings to engage the clips, such hook means extending outwardly from the tube and away from the direction of the bushings. In any case, clip 40, in the present invention, replaces the heavy solid conductor clamp of the above Hawkins, Torr, Annas et al and Gill et al patents, and serves the dual role of conductor clamp and clamp fastener, which fastener secures the clamp to the conductor. The weight of the spacer of the invention is about 1.2 pounds, while the weights of the solid cast structures range from 5 pounds to 6.5 pounds, the spacer of the invention providing substantial savings in weight and material.

The length of legs 42 and the locations of openings 16 in tube 44 are chosen to maintain bushing halves 18 and 32 in compression on conductors 12 when the spacer of the invention is attached to the conductors. For conductor diameters of different sizes, the location of opposed openings 16 in tube 14 is changed relative to the ends of the tube to insure compression of the bushing halves and hence retention of the spacer on the conductor bundle. The second, inside set of opposed openings 16 shown in FIGS. 1 and 2 is provided for a tool (not shown) that can be employed to compress the bushings on the conductors in the process of fixing clips 40 to the ends of tube 14. It can be appreciated that the conductor recess of a cast clamp cannot be easily accommodated to conductors of different diameters. With the arrangement of the present invention, and without changing the size of bushings 18 and 32, by simply changing the location of openings 16 relative to the ends of tube 14, compression can be maintained essentially constant on the bushings within a fairly broad range of conductor diameters, thereby providing a constant grip on the conductor and constant slip loads between the conductor and its surrounding bushing. (Slip load refers to the threshold of an axial force on the conductor that will result in the conductor slipping within and relative to the bushing.)

Before spacer 10 is installed in the bundle of conductors 12, the outside bushing 32 is secured to the inside of clip 40 by inserting the projection 39 of the bushing through an opening 46 (FIG. 2) provided in the base of the U of the clip, as seen in FIG. 2. The flat metal stock of clip 40 is now located in the bottom of the outside peripheral recess 38 (FIG. 4) of the bushing and thus between the outwardly projecting walls 34 of the bushing. Definite corona advantages result from this, as explained hereinafter.

Similarly, before spacer 10 is secured to conductors 12, two inside bushing halves 18 are connected to the respective ends of tube 14 by inserting extensions 20 of the bushings into the ends of the tube. Plate 23, however, is disposed between the extensions (FIG. 2) of each bushing before the extensions are inserted into the tube ends, the plates being held in place by the bushings. When inserted, bushing 18 is oriented to locate its peripheral recesses 26 and outward walls 24 in line with openings 16 provided in the wall of tube 14.

The task of assembling bushings 18 and tube 14 together and of attaching bushing 32 to clip 40 can be performed at the location, for example, where the tube is made, i.e., at the factory or plant location, or the components can be shipped to the site (field) of the overhead conductors (12) by the individual vendors of the components of the spacer 10 for assembly in the field. It should be noted here that no adhesive or glue is required to attach the bushings to their respective components of the spacer, thereby further enhancing the ease of assembly in the field and the reduced cost of the spacer.

In any case, the person installing the spacer of the invention places one of the inside bushings 18, now attached to one of the ends of tube 14, against the inside surface of one conductor 12. The installer then takes an outside bushing 32 secured to a clip 40, via projection 39 in opening 46, and places the bushing on the conductor opposite the inside bushing, the installer directing the legs 42 of clip 40 along the tapered recesses 26 provided on the inside bushing toward the end of the tube. The installer now forces the clip and tube together against the resilience of bushings 18 and 32 until opposed extensions 44 of the clip enter two, opposed openings 16 in the tube. As seen in FIG. 2, extensions 44 of the clip are angled back toward the bushings such that the force of the resilience of the bushings secures the clips to the tube, with legs 42 of the clips being in tension. This, in turn, secures the assembly 10 to the one overhead conductor 12, the legs 42 and extensions 44 of the clip evenly dividing the tension provided by the bushings.

The above procedure is followed in connecting the other end of the tube 14 to the other conductor 12, the clips 40 being effective to secure tube 14 and the bushing halves to the conductors in an efficient, reliable manner.

For example, the spacing device and assembly of the invention are structurally reliable, as tube 14 is directly in line with the forces of any electrical faults (short circuits) occurring on the line, i.e., on the bundle of conductors 12, such forces acting inwardly toward the geometrical center of the bundle. Similarly, when the conductors rebound from such inwardly directed forces, the legs of clips 40 evenly divide the tension and rebound force to insure retention of the spacer 10 on the line.

In further regard to the installation security of assembly 10, the resiliency of the bushings will not allow incomplete installation of 10, as the clip and outside bushing will automatically displace from the conductor and tube 14 if extensions 44 of the clip are not seated in the openings of the tube. In addition, because the metal of clips 40 sits well into and between the walls 34 of the outside bushings and conform to the circular and rounded profile of the outside bushings, the opportunity for the generation of corona is greatly reduced, if not eliminated altogether. Similarly, walls 34 (in cross section) and projection 39 are rounded (39 being one-half of a sphere) to provide profiles that are very good for reducing and eliminating corona.

Another advantage of assembly 10 is the ability to adjust the spacing distance by simply using a longer or shorter tube 14. It can be appreciated that the cast structures of the above-mentioned patents, with integral conductor clamps located at the ends of the spacer bars, are not amenable to such a convenient and inexpensive expedient.

While the invention has been described in terms of preferred embodiments, the claims appended hereto are intended to encompass all embodiments which fall within the spirit of the invention.

Having thus described my invention and certain embodiments thereof, I claim:

1. A boltless device for spacing two parallel conductors comprising
   a hollow rigid arm structure adapted to extend between the conductors,
   first resilient bushing means adapted to respectively engage the ends of the arm and the conductors,
   second resilient bushing means adapted to respectively engage the conductors in opposed relation to the first bushing means,
   two resilient metal clips, and
   means associated with each clip and the rigid arm for securing the clips and arm together at locations adjacent the ends of the arm,
   said clips having a shape that conforms to an outside shape and surface of the second bushing means, such that the clips engage the outside surfaces of the second bushing means the full distance of the surfaces when the clips are secured to the arm.

2. The boltless device of claim 1 in which the rigid arm is a tube having a relatively thin wall.

3. The device of claim 1 including a bearing plate for location between the first bushing means and the ends of the rigid arm.

4. The device of claim 1 in which the means for securing the structures of the clips and rigid arm together comprise openings provided in one of the structures and hook means integral with the other structure for extending in the openings and engaging the structure having the openings.

5. The device of claim 1 in which the first and second bushing means are each provided with a peripheral depression adapted to seat the respective clips in the first and second bushing means such that material of the first and second bushing means extends beyond the material of the clips.

6. The device of claim 1 including means associated with the second bushing means and the clips for securing the clips and second bushing means together.

7. The device of claim 6 in which said means for securing the clip and second bushing together comprises a male projection provided in the peripheral recess of the second bushing means and a corresponding opening provided in the clip.

8. The device of claim 6 including two inclined surfaces and recesses provided in the first bushing means for receiving and guiding the legs of the clips to the ends of the rigid arm when the rigid arm and the clips are oppositely disposed on the conductors.

* * * * *